May 11, 1937. J. M. BOOE 2,080,390
ELECTRODE
Original Filed Dec. 31, 1934
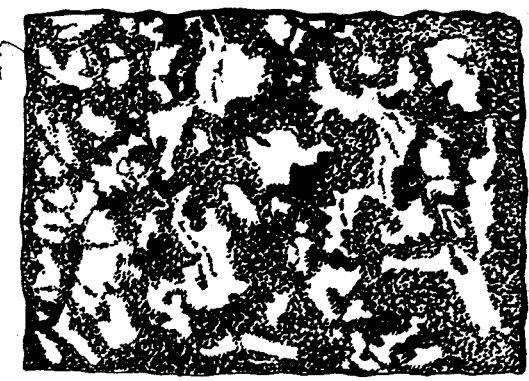
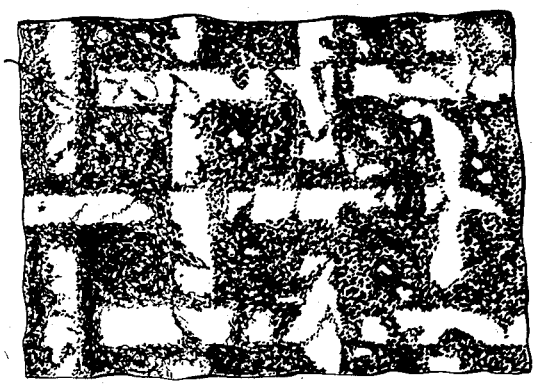
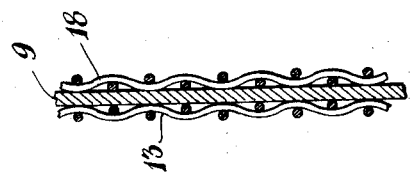
INVENTOR
James M. Booe
BY
ATTORNEY Patented May 11, 1937

2,080,390

UNITED STATES PATENT OFFICE 2,080,390

ELECTRODE

James M. Booe, Indianapolis, Ind., assignor to P. R. Mallory & Co., Inc., Indianapolis, Ind., a corporation of Delaware Original application December 31, 1934, Serial No. 759,898, now Patent No. 2,052,962, dated September 1, 1936. Divided and this application March 14, 1936, Serial No. 68,874

13 Claims. (Cl. 175—315)

This invention relates to metal electrodes for electrolytic condensers and the like, the present application comprising a division of my co-pending application Serial Number 759,898, filed December 31, 1934, now Patent No. 2,052,962.

An object of the invention is to produce an improved electrode for electrolytic devices, electrolytic cells, condensers, asymmetric cells, lightning arrestors and the like.

A further object is to increase the effective electrode surface area of an electrode plate, such as a plate of aluminum foil.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing, the scope of the invention being indicated in the appended claims.

For a fuller understanding of the nature and objects of the invention as well as for specific fulfillment thereof, reference should be had to the following detailed description taken in connection with the accompanying drawing, in which:

Figure 1 is an enlarged sectional view of a metallic sheet and co-operating elements adapted to produce the improved electrode of the present invention according to a preferred method which involves etching;

Figure 2 is a magnified view of the surface of an etched electrode representing one form of the present invention; and Figure 3 is a magnified view of an ordinary etched electrode for comparison.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

While the invention is applicable to metal electrodes in the form of sheets, plates and foils of a wide variety of types and compositions, it is especially suitable for etched metal sheets composed of film-forming metals, i. e., metals which form an adherent current blocking or asymmetrically conductive film when subjected to electric current in the presence of a suitable electrolyte. Such metals find application in devices such as electrolytic cells, condensers, rectifiers and the like. Among the metals of this type are to be included aluminum, tantalum, magnesium, etc. The formation of the surface of the electrode results in a substantially increased effective electrode area and hence affords a greater electrical capacitance.

According to the preferred method of preparing the electrodes of the present invention, a foil 9 to be etched is arranged to pass through an etching bath with its surfaces held in close contact with screen 13 and 18 as indicated in Figure 1. After passing through cleaning and rinsing solutions the end of the foil 9 is led through the etching bath between the screens 13 and 18 and in close contact therewith.

Screens 13 and 18 are preferably of rather fine texture, screens having 100 or 150 meshes to the linear inch, for example, being suitable. The metal forming the screen is so chosen as to promote galvanic etching of the foils or plates when they are placed in contact with the screens in the etching solution. For etching aluminum foil screens of copper or silver are found to be especially applicable.

In general, screens formed of the metals below hydrogen in the electrochemical series of metals will be found most suitable since they are not subject to attack by the acid or etching bath. These metals include antimony, bismuth, arsenic, copper, silver, palladium, platinum, gold, etc.

Some metals above hydrogen in the electrochemical series may be used for the screen, however, without being unduly attacked by the etching bath since they will be protected from solution by the cathodic charge imparted to the screen when in contact with the foil of aluminum (or other metal high in the electrochemical series). Thus nickel or cadmium screens may be used.

In general, it has been found that the most satisfactory characteristics of etch have been obtained where the galvanic couple formed by the plate or foil to be etched, the screen and the acid bath generates a potential difference in the neighborhood of .45 or .5 volt.

It is of considerable advantage to press or roll the etching screen before use in order to obtain the greatest number of contacting points, it being readily appreciated that in a woven wire screen, there is considerable irregularity in the height of the raised points. Pressing or rolling brings substantially all of the raised portions of the weave to the same plane.

In some cases, it may be found desirable to electro-plate the etching screens. In this way, a worn screen may be built up with the metal from which it is composed. Likewise, a base metal screen, for example, copper, may be plated with a more valuable or mechanically weaker metal, such as gold or silver.

The etching process may be carried out as follows: The foil 9 to be etched may first be cleaned by washing in a 5% solution of caustic soda or a solution of hydrofluoric acid and rinsing. The foil, while still wet, is led through the etching bath between screens 13 and 18, then through a washing tank which may contain boiling distilled water after which the foil may be rolled up on a spindle.

It is of considerable importance that the foil be prevented from becoming dry after it has been cleaned in the caustic or cleaning acid solution and rinsed. The foil should preferably enter the etching solution while still wet from the rinse water. It has been found that if the foil dries, even momentarily, between cleaning and etching very little etching can be obtained. This is believed to be due to the formation of a superficial oxide film on the aluminum or other metal of the foil, which film prevents contact between the metal screen and the metal of the foil.

The speed of etching may be regulated to obtain a desired depth of etch. With aluminum foil, copper gauze and 25% hydrochloric acid solution, an etching time of 40 seconds has been successfully employed at a temperature of 40° C. The type and rate of etching may also be varied by controlling the temperature of the etching bath, a temperature above room temperature generally being preferred. By 25% hydrochloric acid is meant a solution of 1 part hydrochloric acid and 3 parts of water by volume, that is, a solution containing approximately 108 grams HCl per liter.

The etched foils produced according to the present invention will have greatly increased effective surface area when used for electrolytic cells, electrolytic condensers, rectifiers and the like due to the variations in depth of etch caused by the presence of the contacting screen. The etched surfaces of the foils will be somewhat spongy in appearance when examined under the microscope and will have a characteristic fretted or "waffle" appearance, as shown at 28 in Figure 2, corresponding to the weave of the screen as contrasted with the irregular, hit-or-miss appearance characterized by absence of any regular pattern of sheets etched by chemicals or acids without the use of screens as shown at 27 in Figure 3.

The advantages obtained by the present etching process appear to be due to a combination of effects and are not believed to be due entirely to any one effect.

It is believed that the advantages result, in part, from the fact that portions of the foil surfaces are protected during etching by the raised parts of the weave of the contacting screens so that etching is prevented or greatly inhibited in small areas distributed uniformly over the surface of the foil. Thus the foil will not be eaten away as uniformly as it would if fully exposed to the bath over its entire surface, and consequently the effective surface area is greatly increased.

The contact between the foil and metal screen completes a galvanic circuit greatly enhancing the rate of etching. On the other hand, the metal screen (and an additional porous protective layer, when used) controls the rate of flow of electrolyte to and from the zone of activity.

A very practical combination for etching aluminum foil appears to be 150 mesh copper gauze used in conjunction with dilute hydrochloric acid (1 part acid to 3 parts water, by volume) at room temperature or above, for example at 40° C.

Dry electrolytic condensers made from foils etched according to the present invention, show markedly higher capacities than condensers of identical dimensions made from unetched foils. A sample condenser made from etched foils had a capacity of 8.78 microfarads whereas a condenser made in identical dimensions of unetched foil had a capacity of only 2.55 microfarads.

Wet electrolytic condensers having film forming surfaces etched in accordance with my process, show a similar increase in capacity.

In some cases it may be preferable, in order to improve the operating characteristics and to obtain a lower power factor, to subject the etched foil to a heat treatment. The etched foil may be heated in air, other gases or in liquids, such as high-boiling alcohols and other high-boiling liquids which are chemically inert to the foil. The heat treatment has a very noticeable effect in increasing the effective capacity and greatly decreasing the series resistance of units made from such treated foil. It is believed that the beneficial effects of the heat treatment are largely due to the removal of gases, principally hydrogen, dissolved in the metal or entrapped in the foil surface.

It has been proposed in the prior art, to clean and roughen plates of film-forming metals by successively immersing them in different acid solutions. This resulted in a haphazard structural appearance of the electrodes as indicated, for example, by Figure 3. According to the present invention a more definite and effective control of the surface structure is obtained and a fairly definite pattern is produced as contrasted with the haphazard structure of the prior art.

While the present invention as to its objects and advantages, has been described herein as carried out in specific embodiments thereof, it is not desired to be limited thereby but it is intended to cover the invention broadly within the spirit and scope of the appended claims.

What is claimed is:

1. As a product of manufacture an electrode body for electrolytic condensers and the like having an etched surface characterized by a fretted waffle appearance and a current-blocking film formed directly on said surface.

2. An electrode for electrolytic condensers and the like comprising a sheet of metal having an etched surface characterized by indentations arranged in a substantially regular pattern.

3. An electrode for electrolytic condensers comprising a sheet of metal having a surface etched to different degrees at different parts of said surface, said etching forming a substantially regular design on said surface.

4. An electrode for electrolytic condensers comprising a sheet of metal having a surface etched to different degrees at different parts of said surface, said etching forming a grating on said surface of at least 100 hills and valleys to the linear inch.

5. An electrode for electrolytic condensers consisting of a sheet of aluminum foil having an etched surface characterized by areas of differing depths of etch, said areas forming a screen design on said surface, whereby said surface area is greater than the surface area of a smooth flat foil of the same dimensions of length and breath, and a current-blocking film formed directly on said surface.

6. An electrode for electrolytic condensers and the like having a surface characterized by a predetermined etched pattern thereon.

7. An electrode for electrolytic condensers and the like having an etched surface characterized by small hills and valleys arranged in a predetermined pattern thereon.

8. A film-forming electrode for electrolytic condensers and the like having an etched surface, the degree of etch varying over the surface according to an orderly pattern.

9. A film-forming electrode for electrolytic condensers and the like having an etched surface, the degree of etch varying over the surface according to a reticular pattern.

10. An electrode for electrolytic condensers and the like having an etched surface characterized by a woven fabric pattern.

11. A film-forming electrode for electrolytic condensers and the like having an etched surface, the degree of etch varying over said surface in a retiform pattern.

12. An electrolytic condenser comprising a pair of electrodes and a film-maintaining electrolyte in contact therewith, at least one of said electrodes being formed of film-forming metal, the surface of said metal being etched to different degrees at different parts of said surface, said etching forming a substantially regular design on said surface, and a current-blocking film formed directly on said surface.

13. A dry electrolytic condenser comprising a pair of electrode foils, a spacer therebetween, and a film-maintaining electrolyte held in said spacer, at least one of said foils being formed of film-forming metal, the surface of said metal being etched to different degrees at different parts of said surface, said etching forming a substantially regular design on said surface, and a current-blocking film formed directly on said surface.

JAMES M. BOOE.